United States Patent Office 3,509,161
Patented Apr. 28, 1970

3,509,161
3-PHENYL-GRANATENE-(2)-DERIVATIVES
Otto Dold, Lampertheim, Hesse, Kurt Stach, Mannheim, and Wolfgang Schaumann, Mannheim-Waldhof, Germany, assignors to C. F. Boehringer & Soehne G.m.b.H., Mannheim-Waldhof, Germany
No Drawing. Continuation-in-part of application Ser. No. 318,839, Oct. 25, 1963. This application July 10, 1967, Ser. No. 652,016
Int. Cl. C07d 43/18
U.S. Cl. 260—293     6 Claims

ABSTRACT OF THE DISCLOSURE

Novel 3-phenyl-granatene-(2)-derivatives are disclosed which constitute unusually potent blood pressure increasing agents. The novel 3-phenyl-granatene derivatives are represented by the following formula:

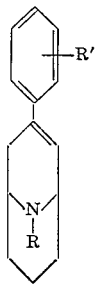

and acid addition salts thereof wherein R is lower alkenyl, phenyl, tolyl or benzyl and R' is hydrogen, halogen, lower alkyl, lower alkoxy, lower alkylmercapto or di-lower alkylamino.

---

This application is a continuation-in-part of application Ser. No. 318,839, filed Oct. 25, 1963, now abandoned.

The present invention relates to novel 3-phenyl-granatene-(2)-derivatives and more particularly to 3-phenyl-granatene-(2)-derivatives as represented by the structural formula:

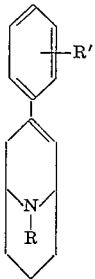

wherein R is selected from the group consisting of hydrogen, alkyl, alkenyl, aralkyl, and aryl and R' is selected from the group consisting of hydrogen, halogen, alkyl, alkoxy, alkylmercapto, and dialkylamino.

Typical examples of the groups represented by the designated substituents of Formula I are the following: R may be hydrogen or a lower alkyl group, that is methyl, ethyl or propyl, a lower alkenyl group such as allyl and vinyl, an aralkyl group such as phenethyl, benzyl, methyl-benzyl or halogeno-benzyl, and an aryl group such as phenyl or tolyl. The substituent R' represents hydrogen or halogen, such as chlorine and bromine, a lower alkyl group such as methyl, ethyl or propyl, an alkoxy group such as methoxy or isopropoxy, an alkylmercapto group, such as methylmercapto, or a dialkylamino group such as dimethylamino or diethylamino.

The compounds of this invention can be manufactured by reacting an N-substituted norgranatanone-(3) of the formula:

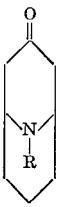

R being defined as hereinabove with an organo-metallic compound having the formula:

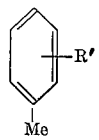

wherein Me is an alkali metal atom or a monovalent magnesium halide residue of a Grignard compound, and R' has the significance indicated above and treating the resulting 3-β-phenyl-granatanole-(3-α) of the structural formula:

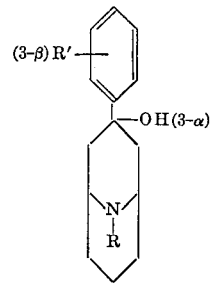

with an agent for splitting off water.

The conversion of compounds II and III to compound IV is conducted under the conventional reaction conditions employed in organo-metallic syntheses. Preferably the reaction is carried out in the presence of lithium-organic compounds. The splitting off of water from the intermediate product (IV) thereby obtained is similarly conducted in the conventional manner. Among the water-separating agents suitable for use in the preparation of the compounds of the invention are inorganic acid halides such as, for example, thionyl chloride, mineral acids, as for instance, hydrochloric acid, etc.

The compounds of the invention possess a number of highly valuable medicinal properties. The 3-phenyl-granatene(2) - derivatives are unusually potent blood pressure increasing agent manifesting this effect through their action on the central nervous system. It has been established that the excitation of the vasomotor center is responsible for the increase in blood pressure as this effect is not produced where the vasomotor center has first been removed surgically. The hypertensive effect of the claimed compounds cannot be compared with the action of the known sympaticomimetics where the blood pressure increase is the result of peripheral vasoconstriction.

However, compared with the central stimulating materials, such as for instance, Cardiazol ® (pentamethylene-tetrazol), and Gevilon ®, (β,β - pentamethylene-γ-hy-droxy-sodium butyrate), the products of the invention are shown to be substantially free of any analeptic effect, this notwithstanding that they actually raise the blood pressure in rats, rabbits, and cats under urethane narcosis, while Cardiazol ® or Gevilon ® are ineffective under such experimental conditions even when employed in spasm-producing doses.

The compounds of the invention accordingly represent qualitatively new pharmacological agents constituting valuable materials for use in the treatment of hypotension.

The 3-phenyl-granatene-(2)-derivatives discussed herein form non-toxic salts with a variety of inorganic and strong organic acids as for example sulfuric acid, hydrochloric acid, hydrobromic acid, hydroiodic acid, phosphoric acid, lactic acid, maleic acid, succinic acid, tartaric acid, acetic acid, benzoic acid, and ascorbic acid.

The invention will appear more fully from the examples which follow. These examples are set forth by way of illustration only, and it will be understood that the invention is not to be construed as limited in spirit or in scope by the details contained therein, as many modifications in materials and methods will be apparent from this disclosure to those skilled in the art.

EXAMPLE 1

N-benzyl-3-phenyl-norgranatene-(2)

(a) N-benzyl-norpseudopelletierine. — 200 g. of a 25% solution of glutardialdehyde are admixed with a solution of 73 g. acetone-dicarboxylic acid, 53.6 g. benzylamine and 28.2 g. sodium acetate-(trihydrate) in 1250 ml. of water. The pH of the admixture is adjusted to a value of 3 with a concentrated hydrochloric acid and the resulting mixture is permitted to stand at room temperature for a period of 3 days. Thereafter the admixture is made alkaline using soda lye and the alkaline mixture extracted several times with chloroform. The extract obtained is dried, concentrated, and the residue distilled. The yield amounts to 70.2 g. (61.2%) of N-benzylnorpseudopelletierine having a $B.P._{0.2}$ of 165–169° C. The N-benzyl-pseudopelletierine melts after recrystallization from petroleum ether at 70–73° C.; and corresponding hydrochloride obtained therefrom in the conventional manner after recrystallization from isopropanol melts at 228° C. (decomposition).

(b) N - benzyl-(3-$\beta$)-phenyl-norgranatanol-(3-$\alpha$).—A grain of iodine is added to 2.1 g. of lithium shavings in 100 ml. of absolute ether. A solution of 23.6 g. (0.15 mol) of bromobenzene in 150 ml. of ether is slowly added dropwise under stirring. In the event that the reaction does not set in, it is initiated, following the addition of the first drop of the bromobenzene solution by slight heating. The onset of the reaction is observed by the disappearance of the iodine coloration and the evolving of heat evidenced by a boiling. On completion of the addition of bromobenzene, heating is continued for another hour under reflux. A solution of 15.3 g. (0.1 mol) of N-benzyl-norpseudopelletierine in 100 ml. of ether is then added dropwise to the mixture whereby the mixture is brought to a boil. Heating is continued for another 4 hours under reflux. Following cooling, 100 ml. of iced water is very carefully added in dropwise fashion, the ether layer is separated, and the aqueous phase extracted by shaking a number of times with ether. The combined ether solutions are dried and concentrated. On distillation of the residue, the yield of N-benzyl-(3-$\beta$)-phenyl-norgranatanol-(3-$\alpha$) having a boiling point of 0.5, 200–215° C. amounts to 16.3 g. (53%). The N-benzyl-(3-$\beta$)-phenyl-norgranatanol-(3-$\alpha$) melts after recrystallization from ligroin at 109–110° C. The hydrochloride produced in the conventional manner is recrystallized from dioxane or isopropanol and melts at 165–166° C. with decomposition.

(c) N-benzyl-3-phenyl-norgranatene-(2).—Method A: 32.6 g. of N-benzyl-3-$\beta$-phenyl-norgranatol-(3-$\alpha$) are added to a solution of 25 ml. of thionyl chloride in 200 ml. of ether in the cold and the resulting mixture heated for 30 minutes under reflux after which the excess thionyl chloride and ether are distilled off. To the resulting residue there is added 20 ml. of ethanol, a solution of 14 g. of potassium hydroxide in 25 ml. of water, 50 ml. of ethanol and finally a solution of 30 g. of potassium hydroxide in 150 ml. of water. This mixture is extracted with ether, the ether solution dried, concentrated, and the residue distilled. The yield of N-benzyl - 3-phenyl-norgranatene-(2) having a boiling point $_{0.4}$ 190–196° C. is 32.9 g. (78.0%).

The base crystallizes and melts after recrystallization from ethanol at 61–62° C. The hydrochloride has a melting point of 201–202° C. (from acetic ester).

Method B: A mixture of 30.7 g. (0.1 mol) of N-benzyl-3 - $\beta$ - phenyl - norgranatanol - (3-$\alpha$) with 50 ml. water and 50 ml. concentrated hydrochloric acid is heated for a period of 7 hours under stirring in a water bath. 200 ml. of water are added to the mixture. The mixture is then rendered alkaline with soda lye and extracted with methylene chloride. The extract is dried and concentrated. On distillation of the residue, the yield of N-benzyl - 3 - phenyl - norgranatene - (2) having a boiling point$_{0.2}$ of 185–198° C. amounts to 20.3 g. (70.2%). The base melts after recrystallization from alcohol at 60–62° C. The corresponding hydrochloride produced in the conventional manner is recrystallized from a mixture of isopropanol and acetic ester and has a melting point of 201–202° C.

EXAMPLE 2

N-ethyl-3-phenyl-norgranatene-(2)

(a) N-ethyl-norpseudopelletierine.—73 g. of acetone-dicarboxylic acid and 28.2 g. of sodium acetate-(trihydrate) are dissolved in 1200 ml. of water and 67.5 g. of a 33% aqueous ethylamine solution and 200 ml. of a 25% aqueous glutardialdehyde solution are then added. The mixture is allowed to stand for 3 days at 20–30° C. Thereafter the mixture is heated for 2 hours at 90–100° C. A concentrated aqueous solution of 75 g. sodium hydroxide is added, and the resulting mixture extracted with chloroform. The extract is dried and concentrated. On distillation of the concentrate, there are obtained 38.1 g. (44.6%) of N-ethyl-norgranatanone-(3) having a boiling point$_{0.1}$ of 90–95° C. in the form of a colorless oil. The hydrochloride is prepared and on recrystallization from dioxane and alcohol the hydrochloride melts at 254° C. (with decomposition).

(b) N - ethyl-(3-$\beta$)-phenyl-norgranatanol-(3-$\alpha$).—The method described in Example 1(b) is followed and there is obtained a 31.1% yield of N-ethyl-(3-$\beta$)phenyl-norgranatanol-(3-$\alpha$) from N - ethyl - norpseudopelletierine and phenyl lithium. The N-ethyl-(3-$\beta$)-phenyl-norgranatanol-(3-$\alpha$) has a boiling point$_{0.3}$ of 155–157° C. and a melting point of 79–80° C. (from ligroin). The hydrochloride melts at 247° C. with decomposition (from ethanol).

(c) N - ethyl-3-phenyl-norgranatene-(2).—45 ml. of thionyl chloride are added slowly to a solution of 30.8 g. of N-ethyl-(3-$\beta$)-phenyl-norgranatanol-(3-$\alpha$) in 110 ml. of absolute ether while cooling with ice. The mixture is heated for 30 minutes at 40° C. and the excess thionyl chloride and ether are distilled off under vacuum. The residue is then dissolved in 50 ml. of ethanol. A solution of 37 g. of potassium hydroxide in 52 ml. of water is added dropwise under ice cooling followed by the addition of a solution of 15.7 g. of potassium hydroxide in 295 ml. of water. The resulting mixture is then extracted with ether, the ether solution is separated off, dried, concentrated, and the residue distilled. The yield of N-ethyl-3-phenyl-norgranatene-(2) having a boiling point$_{14}$ of 177–179° C. amounts to 23.9 g. (80.3%). The hydrochloride melts at 194–196° C. (from methylethylketone).

EXAMPLE 3

N-($\beta$-phenyl)-3-phenyl-norgranatene-(2)

(a) N-($\beta$-phenylethyl)-norpseudopelletierine.—37 g. of acetone-dicarboxylic acid, 14 g. of sodium acetate (trihydrate), 39.4 g. of $\beta$-phenethylamine-hydrochloride, and 100 ml. of a 25% glutardialdehyde solution are dissolved in 600 ml. of water, adjusted to a pH of 3.5 and allowed to stand at room temperature for a period of 4 days. Thereafter, the admixture is alkalinized with soda lye and extracted several times with chloroform. The combined extracts are dried, concentrated, and the residue distilled. The yield of N-($\beta$-phenethyl)-norpseudopelletierine having a boiling point$_{0.1}$ of 180–195° C. amounts to 34 g. (55.8%). The base solidifies at 54–56° C. The hydrochloride prepared in the conventional manner melts at 233° C. under decomposition (from alcohol).

(b) N - (β - phenethyl) - 3 - β - phenyl - norgranatanol-(3-α).—The method of Example 1(b) is followed and a 90% yield of N-(β-phenethyl)-(3-β)-phenyl-norgranatanol-(3-α) is obtained from N-(β-norpseudopelletierine) and phenyl lithium. The N-(β-phenethyl)-(3-β)-phenyl-norgranatanol-(3-α) has a boiling point$_{0.2}$ of 227–234° C., a melting point of 113–114° C. (from ligroin). The corresponding hydrochloride melts at 239–240° C. with decomposition (from isopropanol).

(c) N - (β - phenethyl) - 3 - phenyl - norgranatene-(2).—25.6 g. of N - (β - phenethyl) - 3 - β - phenyl-norgranatanol-(3-α) are mixed with 250 ml. of 6 N hydrochloric acid and the mixture stirred for 7 hours at 95° C. On cooling, the precipitated crystalline material is separated by suction. There is obtained a nearly quantitative yield 28 g. of N-(β-phenethyl)-3-phenyl-norgranatene-(2) in the form of the hydrochloride having a melting point of 274–275° C. (from ethanol). The base can be recovered from an aqueous solution of the hydrochloride with soda lye. The base has a boiling point$_{0.3}$ of 185–193° C.

EXAMPLE 4

3-(p-tolyl)-granatene-(2)

(a) (3 - β) - (p - tolyl) - granatanol - (3 - α).—p-tolyl-lithium is prepared from p-bromotoluol and lithium in ether according to the procedure of Example 1b and thereafter reacted with pseudopelletierine. The yield amounts to 54.3% of (3-β)-(p-tolyl)-granatanol-(3-α) having a boiling point$_{0.1}$ of 190–220° C. and a melting point of 163–164° C. (from ligroin). The corresponding hydrochloride has a melting point of 228° C. under decomposition (from ethanol).

(b) 3 - (p - tolyl)-granatene-(2).—24.7 g. of 3-β-(p-tolyl)-granatanol-(3-α) are dissolved in 60 ml. of water and 60 ml. of concentrated hydrochloric acid and the solution refluxed for 7 hours. Following cooling, the mixture is rendered alkaline with soda lye and extracted with ether. The ether extract is dried, concentrated, and the residue distilled. The yield of 3-(p-tolyl)-granatene-(2) having a boiling point$_{0.15}$ of 123–132° C. recovered is 21 g. (92.6%). The maleinate can be precipitated with maleic acid dissolved in ether from an ether solution of 3-(p-tolyl)-granatene-(2). The salt melts after recrystallization from methylethyl ketone at 149–151° C.

EXAMPLE 5

3-(p-dimethylamino-phenyl)-granatene-(2)

(a) (3-β) - (p - dimethylaminophenyl)-granatanol-(3-α).—2.1 g. (0.3 mol) of lithium shavings in 120 ml. of absolute ether are slowly added to 30 g. (0.15 mol) of p-bromo-dimethylaniline in 150 ml. of absolute ether. The reaction is triggered by the addition thereto of 1 grain of iodine. Following the p-bromo dimethylaniline addition, the mixture is heated for 1 hour under reflux. Thereafter 15.3 g. (0.1 mol) of pseudopelletierine in 100 ml. of absolute ether are added in dropwise fashion. The resulting solution is heated for 4 hours under reflux and then slowly mixed with 100 ml. of ice water. The ether solution is separated, dried, and concentrated. On distillation of the residue, there is recovered 8.3 g. of (3-β)-(p-dimethylaminophenyl)-granatanol-(3-α) having a boiling point $_{0.5}$ of 205–220° C. and a melting point of 106–108° C. (from petroleum ether). The yield amounts to 30.3%.

(b) 3-(dimethylaminophenyl)-granatene-(2).—36.3 g. (3-β)-(p-dimethylaminophenyl) - granatanol - (3 - α) are heated with 50 ml. of concentrated hydrochloric acid and 50 ml. of water under agitation in a boiling water bath for 7 hours. The reaction solution, after cooling, is mixed with 200 ml. of water, rendered alkaline with soda lye and extracted with methylene chloride. The extract is dried, concentrated, and the residue distilled. The yield of 3-(p-dimethylaminophenyl)-granatene-(2) having a boiling point$_{0.4}$ of 193–200° C. is 29.4 g. (86.7%). The base melts after recrystallization from petroleum ether at 79–80° C. The corresponding hydrochloride produced in the usual manner is recrystallized from isopropanol and melts with decomposition at 239° C.

EXAMPLE 6

N-(p-methylbenzyl)-3-phenyl-norgranatene-(2)

(a) N-(p-methylbenzyl)-norpseudopelletierine. — 60.3 g. of acetone-dicarboxylic acid, 23.3 g. of sodium acetate-(trihydrate) and 165.5 ml. of a 25% aqueous glutardialdehyde solution are introduced into 800 ml. of water and 50 g. of p-methylbenzylamine added under stirring. The mixture is allowed to stand for 3 days at room temperature. The reaction mixture is then rendered alkaline with soda lye and extracted with chloroform. The extract is dried, concentrated, and the residue distilled. There are recovered 49.9 g. of N-(p-methylbenzyl)-norpseudopelletierine having a B.P.$_{0.6}$ of 180–187° C. The yield is 48.2%. After recrystallization from ligroin, the N-(p-methylbenzyl)-norpseudopelletierine melts at 103–105° C. The hydrochloride is prepared in the usual manner, on recrystallization from isopropanol and a slight quantity of water, it melts at 249° C. under decomposition.

(b) N-(p-methylbenzyl - 3-β-phenyl-norgranatanol-(3-α).—Following the procedure as described in Example 1(b). N-(p-methylbenzyl)-norpseudopelletierine is reacted with phenyl lithium in ether solution. N-(p-methylbenzyl)-3-β-phenyl-norgranatanol-(3-α) having a B.P.$_{0.2}$ of 208–212° C., a melting point of 133–135° C. (from high boiling petroleum ether) is recovered in a yield of 21.9%. The corresponding hydrochloride melts at 159° C. under decomposition (from isopropanol).

(c) N-(p-methylphenyl)-3-phenyl-norgranatene-(2).— Using the method B, described in greater detail, in connection with Example (1c) above, N-(p-methylbenzyl)-3β-phenyl-norgranatanol-(3-α) is converted to N-(p-methylphenyl) - 3 - phenyl-norgranatene-(2), by heating with concentrated hydrochloric acid. The N-(p-methylphenyl)-3-phenyl-norgranatene-(2) has a B.P.$_{0.2}$ of 170–180° C. The yield amounts to 80.3 %. The hydrochloride melts at 181–183° C. (from acetic ester).

EXAMPLE 7

N-(o-methylbenzyl-3-phenyl-norgranatene-(2)

The process of Example 6 is followed producing:

(a) N-(o-methylbenzyl)norpseudopelletierine. — M.P. 50–52° C. (from petroleum ether).

Yield: 65.0% hydrochloride: M.P. 180° C. (decomposition, from isopropanol).

(b) N-(o-methylbenzyl)-3-β-phenyl-norgranatanol-(3-α).—B.P.$_{0.15}$ 215–232° C., M.P. 94–96° C. (from petroleum ether). Yield: 33.4%.

(c) N-(o-methylbenzyl)-3-phenyl-norgranatene-(2).— B.P.$_{0.15}$ 160–185° C. Yield: 70.7% hydrochloride: M.P. 216–218° C. (from isopropanol).

EXAMPLE 8

N-allyl-3-phenyl-norgranatene-(2)

(a) N-allyl-norpseudopelletierine.—200 ml. of glutardialdehyde, 75 g. of acetone-dicarboxylic acid, 28.2 g. of sodium acetate (trihydrate), and 28.6 g. of allylamine are dissolved in 80 ml. of 6 N hydrochloric acid and 1000 ml. of water. The mixture is allowed to stand at room temperature for a period of 3 days. Thereafter the mixture is rendered alkaline and extracted with chloroform. The extract is dried, concentrated, and the residue distilled. There is recovered 56.8 g. N-allyl-norpseudopelletierine having a B.P.$_{12}$ of 135–137° C.

(yield 63%). The hydrochloride melts at 226° C. (from isopropanol).

(b) N-allyl-3-β-phenyl-norgranatanol-(3-α).—Following the method described in Example 1(b), N-allyl-norpseudopelletierine is reacted with phenyl lithium. The yield is 33.2% of N-allyl-3-β-phenyl-norgranatanol-(3-α) having B.P.$_{0.2}$ of 160–180° C., a melting point of 72–74° C. (from petroleum ether). The hydrochloride melts at 236° C. with decomposition (from isopropanol).

(c) N - allyl-3-phenyl-norgranatene-(2).—N-allyl-3-β-phenyl-norgranatanol-(3-α) is converted using concentrated hydrochloric acid into N-allyl-3-phenyl-norgranatene-(2) following the method described in greater detail in Example 1(c) in a yield of 60.2%. The boiling point of the N-allyl-3-phenyl-norgranatene-(2) is 143–158° C., the melting point is 80–82° C. from acetone. The hydrochloride melts at 193–195° C. (from methylethyl ketone).

EXAMPLE 9

3,N-diphenyl-norgranatene-(2)

(a) N-phenyl-norpseudopelletierine.—100 ml. of glutardialdehyde (25% aqueous solution), 37 g. of acetonedicarboxylic acid, 14 g. of sodium acetate (trihydrate), and 23.3 g. of aniline are dissolved in 650 ml. of water and the pH adjusted to a value of 3.5. After standing for 3 days at room temperature, the mixture is rendered alkaline and extracted with chloroform. The extract is dried, concentrated, and the residue distilled. There are obtained 14.6 g. of N-phenyl-norpseudopelletierine having a B.P.$_{0.2}$ of 165–175° C. (yield 27.1%). On standing, the substance solidifies and melts after recrystallization from acetone at 62–64° C.

(b) 3-β, N - diphenyl-norgranatanol-(3-α).—Following the method described in Example 1(b), N-phenyl-norpseudopelletierine is reacted with phenyl lithium. There are obtained 3-β-N-diphenyl-norgranatanol-(3-α) having a B.P.$_{0.4}$ of 188–225° C. and a M.P. of 106–107° C. (from methanol) in a yield of 33.8%. The hydrochloride melts at 194° C. under decomposition.

(c) 3,N-diphenyl-norgranatene-(2).—As more fully described under Example 1(c), 3-β, N-diphenyl-norgranatnol-(3-α) is converted by heating with concentrated hydrochloric acid into 3, N-diphenyl-norgranatene-(2) in a yield of 51.1%, the 3,N-diphenyl-norgranatene-(2) has a B.P.$_{0.05}$ of 173–183° C. The hydrochloride melts at 177–175.5° C. (from methylethyl ketone).

The new compounds of the invention are intended for use in mammals and were investigated for their acute toxicity, effect on blood pressure and effect on circulation in mammals. In particular, the tests are carried out using mice, rats and rabbits, the same being taken as representative of this group. The tests and the compounds actually used in the investigation are set out in the following: the compounds which were used in the experiment are:

(A) 3-α-phenyl-tropane
(B) 3-(p-tolyl)-granatene-(2)
(C) N-ethyl-3-phenyl-norgranatene-(2)
(D) N-allyl-3-phenyl-norgranatene-(2)
(E) N-benzyl-3-phenyl-norgranatene-(2)
(F) N-(p-methylbenzyl)-3-phenyl-norgranatene-(2)
(G) N-(o-methylbenzyl-3-phenyl-norgranatene-(2)
(H) N-(β-phenethyl)-3-phenyl-norgranatene-(2)

Compound A (3-α-phenyl-tropane) was used as the reference compound. The blood pressure increasing effect of this compound has been described by Lands and Archer, Jour. of Med. and Pharm. Chem. 2/1960, pp. 449–460.

The tests employed follows:

(1) Acute toxicity in mice

The test compounds were administered intravenously and the LD$_{50}$ was determined after 24 hours.

(2) Acute toxicity in rats

The test substances were infused intravenously to rats under urethane narcosis until all the animals expired. The results, as expressed, represent mean values based on 4–5 tests.

(3) Blood pressure increase in rats

The blood pressure was determined during the acute toxicity tests. Blood pressure was observed to rise at the outset of the test and to drop only toward the end of the infusion. The table gives the dosages which have been established as inducing an optimal rise in blood pressure.

(4) Circulatory effects in cats

Intravenous injection of the test substances in cats produced a rise in blood pressure and vascular resistance of varying duration.

The table set out hereinafter indicates the doses which induced an optimal rise in blood pressure without manifesting any toxic phenomenon.

TABLE

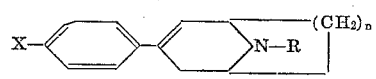

| Compound | x | n | R | LD$_{50}$ mg./kg. Mouse | Intrav. Rat | Optimal blood pressure boosting doses Rat, mg./kg. | Cat, mg./kg. | Min. |
|---|---|---|---|---|---|---|---|---|
| A[1] | H | 1 | CH$_3$ | 7.8 | 19.1 | 2.55 | 1–2 | |
| B | CH$_3$ | 2 | CH$_3$ | 20 | | | 2.0 | |
| C | H | 2 | C$_2$H$_5$ | 8.0 | | | >2.0 | |
| D | H | 2 | Allyl | 7.6 | | | 1.2 | 20 |
| E | H | 2 | Benzyl | 22 | 59.5 | 7.4 | 2–4 | >20 |
| F | H | 2 | p-CH$_3$-Benzyl | 22 | | | 2–3 | >20 |
| G | H | 2 | o-CH$_3$-Benzyl | 32 | | | 2–4 | >20 |
| H | H | 2 | Phenethyl | 10.0 | | | 1.0 | 3–4 |

[1] 3,4-dihydro-compound.

The blood pressure increasing effect of the compounds of the invention is about the same order of magnitude as that of the 3α-phenyl-tropane, however, the compounds of the invention have a much more prolonged effect and/or a lowered toxicity.

The new compounds of the invention are employed as medicinal agents in dosage unit form. Of course, the dosage unit of the novel compounds in accordance with the invention may contain, in addition to the compound of the invention, inert materials. For instance, when the dosage unit form is a tablet, pills or granules, there may also be present various binders, fillers, or solid diluents. When the dosage unit form is a capsule, it may contain, in addition to materials of the above type, the liquid carrier. If the compounds in accordance with the invention are employed as injectable materials, conventional liquid carriers may be employed in connection therewith. Of course, any materials used in preparing the dosage unit form must be pharmaceutically pure and substantially non-toxic in the amount employed.

What is claimed is:
1. N-allyl-3-phenyl-norgranatene-(2).
2. N-benzyl-3-phenyl-norgranatene-(2).
3. N-(p-methylbenzyl)-3-phenyl-norgranatene-(2).
4. N-(o-methylbenzyl)-3-phenyl-norgranatene-(2).
5. 3-(p-dimethylamino-phenyl)-granatene-(2).
6. 3,N-diphenyl-norgranatene-(2).

References Cited

UNITED STATES PATENTS

| | | | |
|---|---|---|---|
| 1,915,334 | 6/1933 | Salzberg et al. | 260—243 |
| 2,075,359 | 3/1937 | Salzberg et al. | 167—22 |
| 3,133,073 | 5/1964 | Archer | 260—292 |
| 3,228,948 | 1/1966 | Dold et al. | 260—293 |

OTHER REFERENCES

Cope et al., J. Am. Chem. Soc. 73, 3419–24 (1951).

HENRY R. JILES, Primary Examiner

G. T. TODD, Assistant Examiner

U.S. Cl. X.R.

260—293.4, 294.7, 999

PO-1050
(5/69)

UNITED STATES PATENT OFFICE
CERTIFICATE OF CORRECTION

Patent No. 3,509,161      Dated April 28, 1970

Inventor(s) Otto Dold, Kurt Stach and Wolfgang Schaumann

It is certified that error appears in the above-identified patent and that said Letters Patent are hereby corrected as shown below:

Column 4, line 64, "(ß-phenyl)" should be --(ß-phenethyl)--

Column 5, line 7, "N-(ß-norpseudopelletierine" should be --N-(ß-phenethyl)-norpseudopelletierine--.

Column 8, line 14, "follows" should be -- follow --.

line 39, "phenomenon" should be --phenomena --.

Columns 7 and 8 - Table, last column, first two items in body of table: should be -- 5 -- and -- 3 --, respectively.

SIGNED AND
SEALED
DEC 29 1970

(SEAL)
Attest:

Edward M. Fletcher, Jr.
Attesting Officer

WILLIAM E. SCHUYLER, JR.
Commissioner of Patents